United States Patent [19]
Louzecky

[11] 3,877,852
[45] Apr. 15, 1975

[54] ROTARY ENGINE DRAIN PUMP ARRANGEMENT

[75] Inventor: Paul J. Louzecky, Troy, Mich.

[73] Assignee: General Motors Corporation, Detroit, Mich.

[22] Filed: Feb. 27, 1974

[21] Appl. No.: 446,312

[52] U.S. Cl.................................. 418/88; 418/94
[51] Int. Cl..................... F01c 21/04; F04c 29/02
[58] Field of Search ............ 123/8.01, 8.45; 418/83, 418/88, 91, 94

[56] References Cited
UNITED STATES PATENTS

| | | | |
|---|---|---|---|
| 3,180,323 | 4/1965 | Paschke | 418/94 X |
| 3,712,766 | 1/1973 | Jones | 418/88 |
| 3,762,377 | 10/1973 | Anthony | 123/8.01 |

Primary Examiner—C. J. Husar
Assistant Examiner—Michael Koczo, Jr.
Attorney, Agent, or Firm—Ronald L. Phillips

[57] ABSTRACT

A rotary engine having a drain pump arrangement with a pumping hole through the eccentric of the engine's crankshaft for pumping drain oil away from the engine's phasing gear cavity.

3 Claims, 3 Drawing Figures

ROTARY ENGINE DRAIN PUMP ARRANGEMENT

In a four-cycle rotary combustion engine, oil is normally required to lubricate the rotor, crankshaft bearings and phase gears and is also circulated to cool the rotor, the latter being accomplished by making the rotor hollow and having oil circulated therethrough. In such an arrangement it has been found that some of the oil draining from the bearings and rotor is trapped in the cavity containing the phasing gears from which it may have trouble draining to the engine's normal oil reservoir. Any trapped oil is churned by the gears and if this pumping action by the gears is excessive, it can cause an increase in engine friction and oil overheating and, in addition, the trapped oil between the gear teeth may overload the phasing gears and cause possible damage thereto.

According to the present invention there is provided a drain pump arrangement of extremely simple structure which operates to prevent the accumulation of an excessive amount of oil in and around the phasing gears. In this unique arrangement there is formed a pumping hole through the eccentric of the engine's crankshaft which at its inlet is open to the phasing gear cavity and at its outlet is open to the drain side of the rotor. The pumping hole is oriented so that on crankshaft rotation there is provided both a centrifugal effect and an inertia effect which cooperate to pump oil away from the phasing gears to prevent an excessive amount of drain oil from being trapped in and around the phasing gears.

An object of the present invention is to provide a new and improved drain oil arrangement for the phasing gears in a rotary combustion engine.

Another object is to provide in a rotary combustion engine a drain pump arrangement utilizing only a simple hole through the eccentric of the engine's crankshaft to effect a pumping action that prevents the accumulation of an excessive amount of oil in and around the engine's phasing gears.

Another object is to provide in a rotary combustion engine a drain pump arrangement utilizing only a simple hole through the eccentric of the engine's crankshaft to effect a pumping action produced both by centrifugal action and inertial action that removes oil from in and around the engine's phasing gears.

These and other objects of the present invention will be more apparent from the following description and drawing in which.

Figure 1:
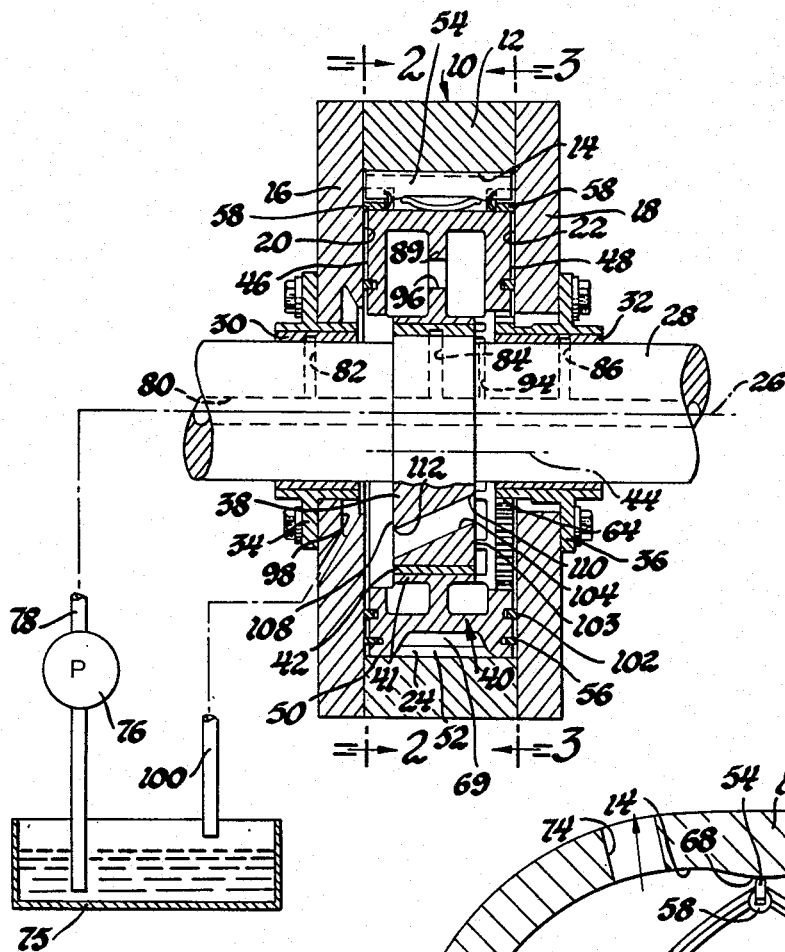
FIG. 1 is a view with parts in section and some parts shown schematically of a rotary combustion engine having a drain pump arrangement according to the present invention.
Figure 2:
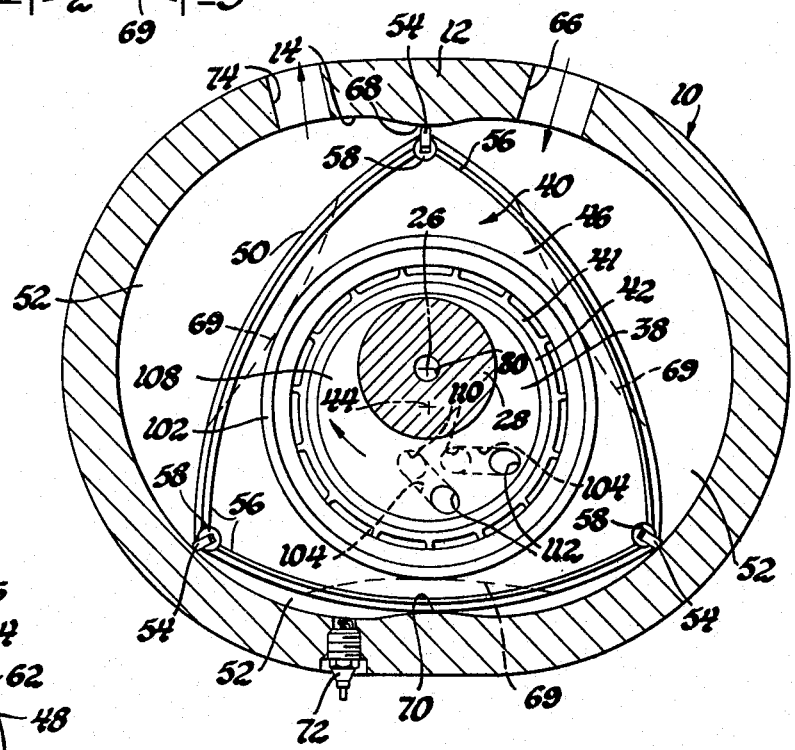
FIG. 2 is a view taken along the line 2—2 in FIG. 1.
Figure 3:
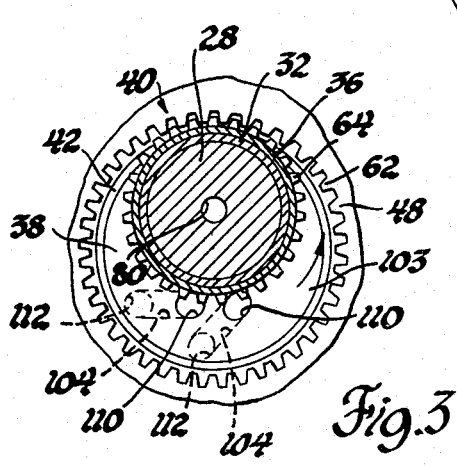
FIG. 3 is a partial view taken along the line 3—3 in FIG. 1.

The drain pump arrangement according to the present invention is particularly suited for use in a rotary combustion engine of the planetary type such as shown in FIGS. 1, 2 and 3. The engine comprises a housing 10 which in a single rotor arrangement has basically three parts; namely, a rotor housing 12 having an inwardly facing inner peripheral wall 14 and a pair of end housings 16 and 18 having parallel, oppositely facing, spaced inner end walls 20 and 22, respectively. The housing parts are secured together by bolts, not shown, and the inner housing walls 14, 20 and 22 cooperatively provide a cavity 24. As shown in FIG. 2, the inner peripheral wall 14 is in the shape of a two-lobed epitrochoid or a curve parallel thereto whose center line is indicated at 26. A crankshaft 28 extends through the cavity 24 and is rotatably supported in main bearings 30 and 32 which are secured in collars 34 and 36 that are bolted to the end housings 16 and 18 as shown in FIG. 1, the crankshaft axis being coincident with the center line 26, parallel to the peripheral wall 14 and at right angles to the end walls 20 and 22. The crankshaft 28 is provided in the cavity 24 with an eccentric 38 which typically has a much larger diameter than the crankshaft's main journals. A hollow rotor 40 has a hub 41 having a rotor bearing 42 secured therein which is received on the eccentric 38 so that the rotor is thereby supported for rotation about the eccentric's center line 44 which is thus the rotor's axis.

The rotor 40 has the general shape of a triangle with two parallel side walls 46 and 48 at right angles to the rotor axis which face and run close to the end walls 20 and 22, respectively, and a peripheral wall 50 having three arcuate outer faces which face the peripheral wall 14 and cooperate therewith and with the end walls 20 and 22 to define three variable volume working chambers 52. Sealing of these three chambers from each other is effected by sealing means comprising three apex seals 54 which are each mounted in an axially extending groove or slot at each apex or corner of the rotor 40 and extend the width thereof. Three arcuate side seals 56 are mounted in accommodating grooves in each rotor side and extend adjacent the rotor faces between two of the apex seals 54. Three cylindrical corner seals 58 are mounted in cylindrical blind bores in each rotor side with each corner seal providing sealing between the ends of two side seals and one apex seal as shown in FIG. 2. The apex seals 54 are spring biased to continuously engage the peripheral wall 14 and both the side seals 56 and the corner seals 58 are spring biased to continuously engage the respective end walls 20 and 22 with the complete gas seal arrangement acting to seal the working chambers.

With the two-lobed peripheral wall 14 and the three corner rotor 40, each of the working chambers 52 sequentially expands and contracts between minimum and maximum volume twice during each revolution in fixed relation to the housing by forcing the rotor to rotate at one-third the speed of the crankshaft. This is accomplished by gearing comprising an internal tooth rotary phasing gear 62 which is formed integral with one side wall 48 of the rotor and concentric with the rotor axis. The gear 62 meshes with an external tooth annular stationary phasing gear 64 which is freely received about and is concentric with the crankshaft 28 and is made stationary by being formed integral with the left-hand end of the right-hand collar 36 as shown in FIG. 1. The gear 62 has one and one-half times the number of teeth as the gear 64 to provide the required speed ratio of 3:1 between the crankshaft and the rotor.

A combustible air-fuel mixture from a suitable carburetor arrangement, not shown, is made available to each working chamber 52 by an intake passage 66 on the leading side of the peripheral wall's cusp 68 relative to the direction of rotor rotation indicated by the arrow in FIG. 2. A single channel or recess 69 is provided in the center of each chamber face of the rotor to provide for the transfer of the working gas past the peripheral wall's other cusp 70 while the rotor face is at or near a top-dead-center position, as shown in FIG. 2, so that the chambers are not divided by the cusp 70 at the time when combustion is occurring therein. A spark plug 72 is mounted in the rotor housing 12 adjacent the cusp 70 with its electrodes exposed to the passing working chambers. As the rotor planetates, the working chambers successively draw in fuel mixture and the fuel mixture is then trapped in each working chamber and compressed and when the rotor face of this chamber is in the vicinity of top-dead-center, this mixture is ignited at the completion of the compression phase, there being provided a suitable ignition system, not shown, for applying voltage to the spark plug at the proper time. Upon ignition of the mixture in each working chamber, the peripheral wall 14 takes the reaction forcing the rotor to continue rotating while the gas is expanding. The leading apex seal 54 of each of the working chambers eventually traverses an exhaust passage 74 in the rotor housing on the trailing side of the cusp 68 whereby the exhaust products are then expelled to complete the cycle.

Describing now the lubrication of this arrangement and also the cooling of the rotor, oil from the engine drains to a sump 75 from which it is drawn by a suitable pump 76 powered from the engine crankshaft 28 and then delivered via a delivery line 78 to an axial oil passage 80 through the crankshaft 28. Radial oil passages 82, 84 and 86 in the crankshaft deliver oil from the passage 80 to lubricate the bearings 30, 42 and 32, respectively. The hollow rotor 40 is of the so-called I-beam type in cross-section with a central radially extending rib 89 between the rotor's peripheral wall 50 and the hub 41 and with the rotor side walls 46 and 48 extending radially inward from the peripheral wall with annular spaces left between these side walls and rotor hub. A radial oil passage 94 in the crankshaft 28 delivers oil from the passage 80 radially outward between the right side of the eccentric 38 and the left side of the phasing gears 62 and 64 to the interior of the rotor for cooling. The oil passes from the right to the left side of the central rib 89 via axially extending, angularly spaced holes 96 therethrough with the oil carrying the heat from the rotor by passing out the left side of the rotor to an annular drain cavity 98 in the end wall 20. The drain cavity 98 is connected to a return line 100 that drains to sump 75. A circular oil seal 102 mounted in an accommodating groove in each side wall of the rotor so that it is centered on the rotor axis in a radial location inward of the side seals 56 is spring biased to engage the opposite housing end wall to prevent the oil from reaching the gas seals.

The engine structure thus far described is of a conventional type with lubrication provided by the pump 76 feeding oil to the main bearings, rotor bearing and phasing gears and the rotor cooled by the oil circulated therethrough. In such an arrangement some of the oil draining back toward the sump may be trapped on the phasing gear side of the rotor in what may be described as the annular phasing gear cavity which is bordered by the end wall 22, rotor side 48, crankshaft 28 and the right side 103 of the eccentric 38. In such an event the trapped oil will be churned by the phasing gears and if this pumping action of the gears is excessive, it will cause an increase in engine friction and overheating of the oil and, in addition, the trapped oil between the gear teeth may overload the phasing gears and cause damage thereto. It is particularly not desirable to have the phasing gears operate as a pump to such an extent, the engine's oil pressure requirements being normally well satisfied by the pump 76. According to the present invention there is provided an extremely simple drain pump arrangement that prevents the accumulation of an excessive amount of oil in and around the phasing gears and comprises one or more pumping holes 104 drilled through the crankshaft's eccentric 38 from the phasing gear side 103 thereof to the other side 108 thereof which may be described as the drain side. The pumping holes 104 are radially located in the eccentric 38 radially outward of the crankshaft journals as best shown in FIGS. 1 and 2. Each pumping hole has an inlet 110 at the eccentric's phasing gear side 103, as shown in FIGS. 1 and 3, which is located at a predetermined distance from the crankshaft axis so as to always be open to the crescent shaped space between the phasing gears 62 and 64. Furthermore, each of the pumping holes 104 has an outlet 112 on the eccentric's drain side 108, as shown in FIGS. 1 and 2, which is located at a substantially greater distance from the crankshaft axis, each pumping hole thus extending radially outward from inlet to outlet as best shown in FIG. 1. As a result, oil can always readily enter the inlet 110 from the phasing gear cavity whereafter it is then subjected to centrifugal force by rotation of the crankshaft and there is produced a centrifugal pumping action to force the oil to flow toward the outlet 112 from whence it can then proceed to the drain cavity 98. Furthermore, each of the pumping holes 104 is arranged at a compound angle relative to the direction of crankshaft rotation with its center line not passing through the crankshaft axis 26, as shown in FIGS. 2 and 3, so that the inlet 110 leads the outlet 112 relative to the direction of rotation, as shown in FIGS. 2 and 3, to allow the inertia of the oil to assist the centrifugal pumping effect. In other words, the compound angle rather than a simple angle provides utilization of both the direction of rotation of the crankshaft and the change in centrifugal force for pumping action to prevent accumulation of an excessive amount of oil in and around the phasing gears.

The above described embodiment is illustrative of the invention which may be modified within the scope of the appended claims.

I claim:

1. A rotary engine comprising an engine housing having internal walls cooperatively defining a cavity, a crankshaft extending through said cavity and rotatably supported by said housing, said crankshaft having an eccentric located in said cavity, a rotor rotatably mounted on said eccentric in said cavity, a rotary phasing gear concentric with said eccentric fixed to one side of said rotor, a stationary phasing gear concentric with said crankshaft fixed to said housing and meshing with said rotary phasing gear, said rotor cooperating with said walls of said housing to provide a plurality of chambers that are spaced about and move with said rotor while varying in volume as said rotor and said crankshaft rotate, oil supply passage means for supplying oil to lubricate parts of said engine including said phasing gears and also to the interior of said rotor for cooling, oil drain passage means for draining the oil from the parts that are lubricated and cooled, and drain pump means for pumping oil away from said phasing gears and toward said oil drain passage means comprising a pumping hole through said eccentric, said pumping hole having an inlet at the phasing gear side of said eccentric and an outlet at the other side of said eccentric that trails said inlet relative to the direction of rotation so that the inertia of the oil acts to pump oil away from said phasing gears.

2. A rotary engine comprising an engine housing having internal walls cooperatively defining a cavity, a crankshaft extending through said cavity and rotatably supported by said housing, said crankshaft having an eccentric located in said cavity, a rotor rotatably mounted on said eccentric in said cavity, a rotary phasing gear concentric with said eccentric fixed to one side of said rotor, a stationary phasing gear concentric with said crankshaft fixed to said housing and meshing with said rotary phasing gear, said rotor cooperating with said walls of said housing to provide a plurality of chambers that are spaced about and move with said rotor while varying in volume as said rotor and said crankshaft rotate, oil supply passage means for supplying oil to lubricate parts of said engine including said phasing gears and also to the interior of said rotor for cooling, oil drain passage means for draining the oil from the parts that are lubricated and cooled, and drain pump means for pumping oil away from said phasing gears and toward said oil drain passage means comprising a pumping hole through said eccentric, said pumping hole having an inlet at the phasing gear side of said eccentric that is located a substantial distance from the axis of said crankshaft and an outlet at the other side of said eccentric that is located at a substantially larger distance from the axis of said crankshaft so that there is provided a change in centrifugal force on the oil that increases from said inlet to said outlet to pump oil away from said phasing gears.

3. A rotary engine comprising an engine housing having internal walls cooperatively defining a cavity, a crankshaft extending through said cavity and rotatably supported by said housing, said crankshaft having an eccentric located in said cavity, a rotor rotatably mounted on said eccentric in said cavity, a rotary phasing gear concentric with said eccentric fixed to one side of said rotor, a stationary phasing gear concentric with said crankshaft fixed to said housing and meshing with said rotary phasing gear, said rotor cooperating with said walls of said housing to provide a plurality of chambers that are spaced about and move with said rotor while varying in volume as said rotor and said crankshaft rotate, oil supply passage means for supplying oil to lubricate parts of said engine including said phasing gears and also to the interior of said rotor for cooling, oil drain passage means for draining the oil from the parts that are lubricated and cooled, and drain pump means for pumping oil away from said phasing gears and toward said oil drain passage means comprising a straight pumping hole through said eccentric, said pumping hole having an inlet at the phasing gear side of said eccentric that is located a substantial distance from the axis of said crankshaft and is always open to the space between said phasing gears and an outlet at the other side of said eccentric that is located at a substantially greater distance from the axis of said crankshaft so that there is provided a change in centrifugal force on the oil that increases from said inlet to said outlet to pump oil away from said phasing gears, said pumping hole also arranged relative to the direction of crankshaft rotation so that said inlet leads said outlet to provide for the inertia of the oil to assist the centrifugal force effect in pumping oil from said phasing gears.

* * * * *